United States Patent [19]

Hutchins et al.

[11] 4,266,853

[45] May 12, 1981

[54] DEVICE FOR ORGANIZING OPTICAL FIBERS AND THE LIKE

[75] Inventors: Terence N. Hutchins; François C. Meunier, both of Kirkland, Canada

[73] Assignee: Northern Telecom Limited, Montreal, Canada

[21] Appl. No.: 19,512

[22] Filed: Mar. 12, 1979

[51] Int. Cl.³ .............................................. G02B 5/14
[52] U.S. Cl. .................................. 350/96.20; 211/47; 312/327
[58] Field of Search ............... 350/96.20, 96.21, 96.22; 312/120, 123, 126, 308, 327; 248/544, 240.4; 211/47, 495, 128, 150, 171

[56] References Cited

U.S. PATENT DOCUMENTS

| | | | |
|---|---|---|---|
| 1,013,576 | 1/1912 | WermerSkirchen | 312/327 UX |
| 2,928,551 | 3/1960 | Abrams et al. | 211/49 S |
| 3,072,263 | 1/1963 | Cohen | 211/171 |
| 3,235,093 | 2/1966 | Eisbart et al. | 211/47 |
| 3,534,863 | 10/1970 | Howard | 211/47 |
| 4,171,867 | 10/1979 | Cocito | 350/96.21 |

FOREIGN PATENT DOCUMENTS 2363243  3/1978  France ................. 350/96.21

*Primary Examiner*—John K. Corbin
*Assistant Examiner*—John D. Lee
*Attorney, Agent, or Firm*—Achmed N. Sadik

[57] ABSTRACT

A device for organizing optical fibers and the like at splice or slack points is provided. The device comprises a plurality of stacked tray-like supports having partially turned-up edges, with each separately hinged at one side thereof to a carrier. Each tray-like support is adapted to retain a looped fiber portion without damage by having a width at least equal to twice the minimum bending radius specified for that fiber.

10 Claims, 6 Drawing Figures

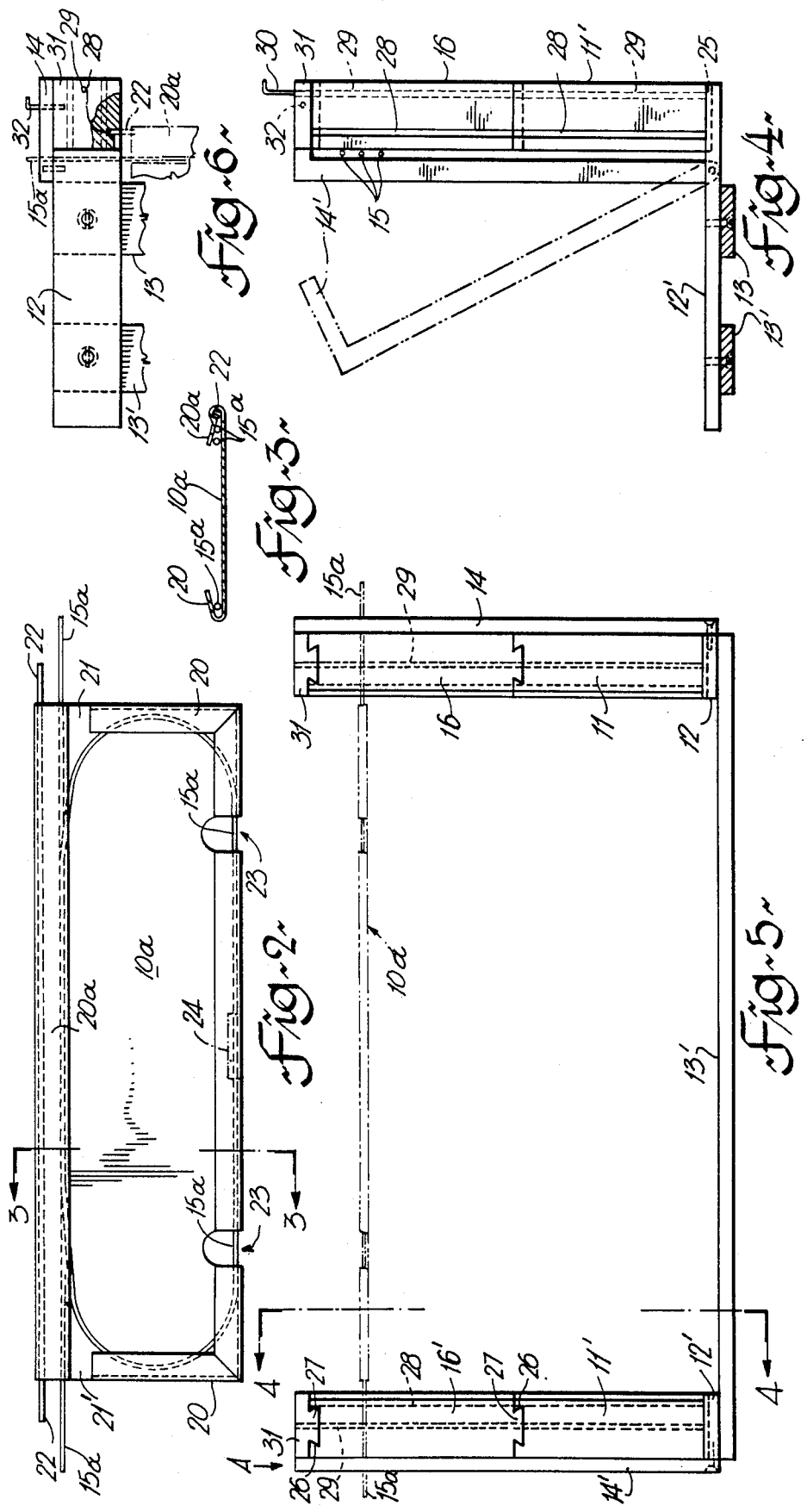

DEVICE FOR ORGANIZING OPTICAL FIBERS AND THE LIKE

FIELD OF THE INVENTION

The present invention relates to optical fibers in general and more particularly to the organizing of optical fibers at slack or splice points.

BACKGROUND AND SUMMARY OF THE INVENTION

The handling of optical fibers requires special care. This is particularly true in splice enclosures. Due to their size, which can be as small as 0.002" in diameter, the handling of fibers is a problem. Transmission capabilities will be impaired if a fiber is bent beyond the permanent bending radius, the point at which light is no longer totally contained in the core of the fiber. Furthermore, fibers are brittle and will break if bent beyond the minimum bending radius. Unconventional methods for the handling and storage of fibers must therefore be devised. While glass and silica (the materials used to make optical fibers) are in some respects stronger than steel, fibers normally do not possess this potential strength because of microscopic surface fractures which are vulnerable to stress and spread, causing the fiber to break easily. Thus the take-up of fiber slack in a closure presents a problem for multi-fiber cables, where individual fiber splices are required to facilitate rearrangements and repairs. Another problem is that of identifying individual fibers. In large multi-fiber cables each fiber must be readily identifiable for subsequent testing and repairs. Unlike copper where the insulation may be colour coded, coding is difficult with individual optical fibers.

In an attempt to mitigate these problems, a standard splice enclosure with a central transverse bulkhead was used. The individual fibers are spliced and are attached to the bulkhead for support. A disadvantage of this approach is that storage of slack in the fibers is not provided for. Furthermore, each of the fibers must be individually tagged for identification purposes.

Another approach uses a ribbon type optical fiber arrangement where twelve fibers are fixed together side by side. Twelve of these ribbons are then stacked one on top of another to obtain a cable containing 144 individual fibers. The fibers are bulk spliced using an epoxy technique and the cable is placed in a standard splice enclosure. Disadvantages of the above approach are the lack of access to individual fibers and, again, no slack storage. A single fiber failure is impossible to repair, and the fiber must be taken out of service.

In other splicing arrangements all the fibers in a cable are looped within the same retainer or fiber slack is stored on spools. In either case identification, repair or splice work of individual fibers is extremely difficult without a major shuffle in the splice enclosure. This is undesirable as transmission capability can be affected in working fibers as they are moved.

The present invention mitigates these problems by providing a device for organizing, segregating and protecting a plurality of individual optical fibers or other similar type conductors or fibers at a slack or splice point. A device having modular construction is provided which is suitable for installation in standard splice enclosures. The device comprises a plurality of tray-like members each adapted to retain and store the slack in at least one fiber. The device provides easy access to the individual fibers contained in the trays. Each tray is marked to identify individual fibers therein. The trays are stacked one on top of the other, and are each hinged separately at one side thereof to a carrier, thus allowing them to move relative to one another like bound pages. To provide additional capacity, the carrier structure is extended by adding to it and more trays are then stacked.

Thus in accordance with the present invention there is provided a device for organizing optical fibers and the like including a plurality of stacked traylike supports, having at least partially turned up edges for retaining a looped fiber portion, separately hinged at one side to a carrier and having a width at least equal to twice the minimum bending radius specified for that fiber.

BRIEF DESCRIPTION OF THE DRAWINGS

The preferred embodiment will now be described in conjunction with the drawings in which:

FIG. 2 is a top view of a tray of the device of FIG. 1;

FIG. 3 is a cross-sectional view along the line 3—3 of FIG. 2;

FIG. 4 is a side view of the base and support member assembly of the device of FIG. 1;

FIG. 5 is a front view of the base and support post assembly of FIG. 4; and

FIG. 6 is a top view of the base and support member of FIG. 4.

DESCRIPTION OF THE PREFERRED EMBODIMENT

Figure 1:
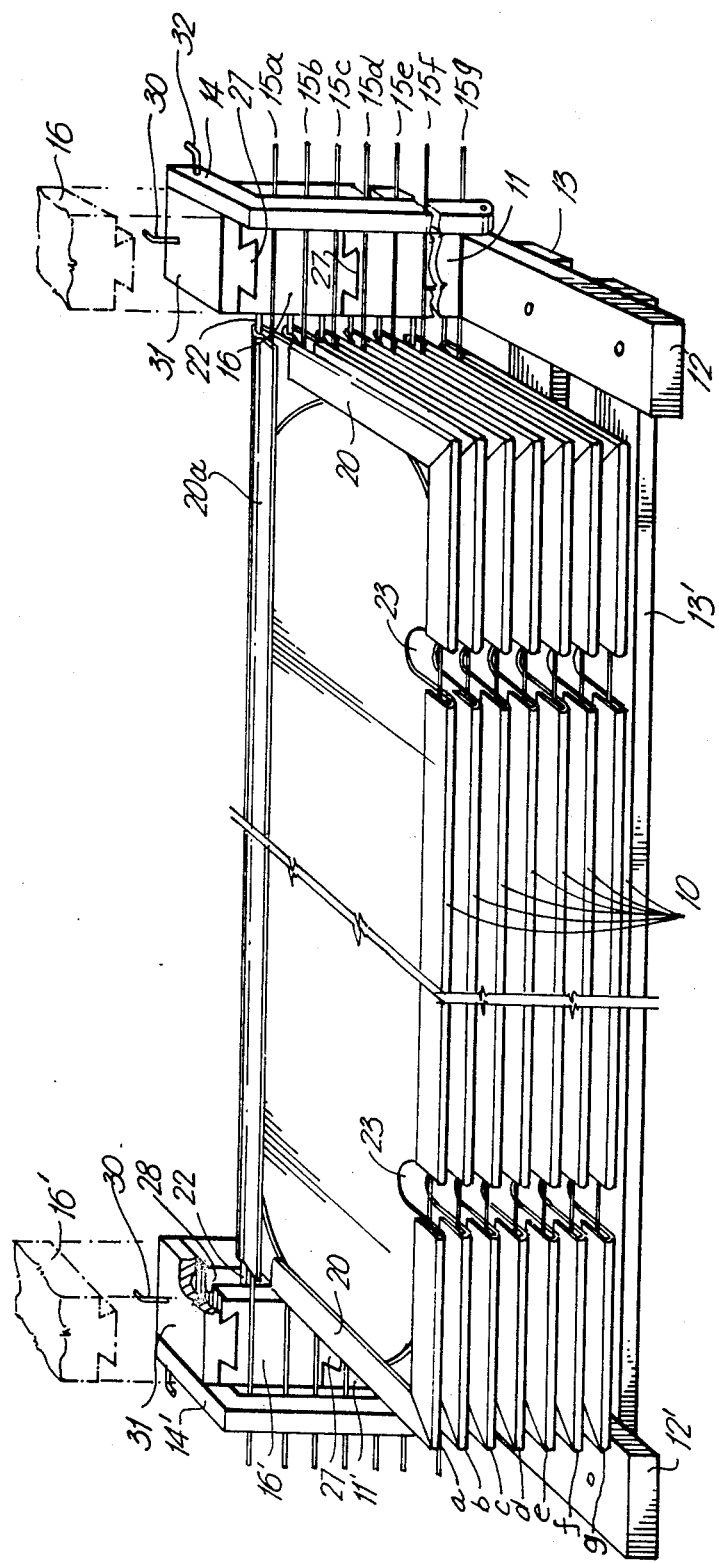
FIG. 1 is a perspective view of a device for organizing optical fibers in accordance with the invention.

The device for organizing optical fibers is modular in structure. Referring to FIG. 1 of the drawings, the device comprises a plurality of stacked tray-like supports 10a to 10g (trays hereinafter) hinged at one side thereof to a carrier consisting of two vertical support members 11 and 11' and two base end members 12 and 12'. The base end members 12 and 12' are held in spaced relationship by longitudinal base members 13 and 13'. A retainer bar 14 maintains fibers 15a to 15g in close proximity to said vertical members. In order to expand the capacity, additional vertical support members 16 and 16' are placed on top of vertical support members 11 and 11' and trays are stacked in.

A typical tray 10a, as best illustrated in FIGS. 2 and 3, is a generally flat rectangular piece with partially turned up edges to form a fiber retaining lip 20 at the periphery of tray 10a. Spaces 21 and 21' are left on either end of tray 10 for insertion of the fiber 15a. The fiber 15a is looped around the tray 10a and held therein by the retaining lip 20. A pair of hinging pins 22 extend from the rearward retaining lip 20a beyond the ends of the tray 10a and cooperate with the vertical support members 11 and 11a. Pins 22 may be disposed under the retaining lip 20a or an integral part of the tray 10a.

The size of the tray 10a is dependent on the minimum bending radius of the fiber 15a. The tray 10a must be wider than twice the minimum bending radius in order to avoid damaging or breaking the fiber 15. As well to avoid impairment to the transmission capabilities of the fiber the tray 10a is preferably at least as wide as twice the permanent bending radius. The width of twice the permanent bending radius has been found preferable as it allows a reasonable safety margin, in handling the fibers and keeps the trays as narrow as possible. The length of the tray 10a is dependent on the amount of storage of slack required. In the front edge of each tray 10a there is at least one cut-out 23 in the retaining lip 20—provided for access to the fiber 15a to facilitate removal. If the tray 10a is used for splice storage the splice 24 would usually be disposed under the front retaining lip 20.

As illustrated in FIGS. 4, 5 and 6, the vertical support member 11 engages base end member 12 in a releasable dovetail joint 25. Base members 12 and 12' are held in appropriate spaced relationship by longitudinal base members 13 and 13'. The top of vertical support members 11 and 11' and 16 and 16' are formed in a female dovetail 26 with the bottom of vertical support members 11 and 11' and 16 and 16' formed in a male dovetail 27 allowing vertical support members 11 and 16 and 11' and 16' to be stacked. The vertical support member 11 has a generally rectangular cross-section with an end to end groove 28 cut into its inner side to accept pins 22. A small hole 29 is drilled the length of the vertical support member 11 and 11' and 16 and 16' to accept retaining pin 30 which holds vertical support members 11 and 16 and 11' and 16' respectively from sliding apart when they are stacked. Vertical support members 11 and 16 and 11' and 16' are identical. Top caps 31 each have a male dovetail bottom 27 which mates with the female dovetail 26 on the top of vertical support members 11 and 11' or 16 and 16'. The top cap 31 holds the pins 22 in place. The hole 29 is also drilled through the top cap 31 to accept retaining pin 30. Retainer bars 14 and 14' are L-shaped members pivotally attached to the outside of base members 12 and 12' respectively and can be releasably pinned to the top cap 31 by pin 32. The retainer bars 14 and 14' can be pivoted out of the way when installation or repairs are being made.

During installation the base members 12 and 12' and 13 and 13' and the vertical support members 11 and 11' are placed in position. A first tray 10g is put in place by sliding the ends of the pins 22 down the groove 28 in the vertical support members 11 and 11'. The fiber 15g is spliced if necessary and installed in a loop around the tray 10g. A second tray 10f is put in place and the fiber 15f installed. This procedure continues until all trays 10a to 10g and fibers 15a to 15g have been installed. If necessary additional vertical support members 16 and 16' can be used to increase the capacity of the system.

Once all trays 10a to 10g are installed the top caps 31 are put in place, retaining pins 30 inserted and fiber retainers 14 and 14' installed.

For repair, the fiber retainers 14 and 14' are pivoted away, the necessary tray (say tray 10d) is located and the trays 10a, 10b and 10c above are hinged out of the way on pins 22. Easy access is now available to the appropriate fiber 15d. Once repairs are made the trays 10a, 10b and 10c are replaced in their normal position and the fiber retainers 14 and 14' are pivoted back into position.

The trays are preferably made of aluminum or a molded thermosetting plastic. The vertical support members are preferably thermosetting plastic.

What is claimed is:

1. A device for organizing optical fibers and the like comprising a plurality of stacked tray-like supports having partially turned-up edges for retaining a looped fiber portion, each tray-like support separately hinged to a carrier and having a width at least equal to twice the minimum bending radius specified for that fiber for accommodating continuous longitudinal slack in the fiber.

2. A device for organizing optical fibers and the like as claimed in claim 1 wherein said tray-like support width is equal to at least twice the permanent bending radius specified for said fiber.

3. A device for organizing optical fibers and the like as claimed in claim 2, wherein said tray-like supports having two openings in said turned-up edges for entry and exit of said fiber thereonto and at least one further opening in said edge providing access to said fiber.

4. A device for organizing optical fibers and the like as claimed in claim 3, said tray-like supports having protruding hinging pins along one edge thereof.

5. A device for organizing optical fibers and the like as claimed in claim 4 said carrier comprising two vertical members with vertical grooves therein for receiving said hinging pins.

6. A device for organizing optical fibers and the like as claimed in claim 5, said carrier further comprising a pair of retaining bars for maintaining ingoing and outgoing fibers in close proximity to said vertical members.

7. A device for organizing optical fibers and the like as claimed in claim 5 wherein said tray-like supports are made of aluminum.

8. A device for organizing optical fibers and the like as claimed in claim 7 wherein said carrier is made from plastic.

9. A device for organizing optical fibers and the like as claimed in claim 5 wherein said tray-like support is made of molded plastic.

10. A device for organizing optical fibers and the like as claimed in claim 9 wherein said carrier is made from plastic.

* * * * *